(12) United States Patent
Wal, III

(10) Patent No.: US 7,036,810 B2
(45) Date of Patent: May 2, 2006

(54) MODULAR TOOLING APPARATUS WITH TAPERED LOCATER SYSTEM

(76) Inventor: H. James Vander Wal, III, 7112-30th St. SE., Ada, MI (US) 49301-9312

( * ) Notice: Subject to any disclaimer, the term of this patent is extended or adjusted under 35 U.S.C. 154(b) by 247 days.

(21) Appl. No.: 10/355,709

(22) Filed: Jan. 31, 2003

(65) Prior Publication Data

US 2003/0222388 A1 Dec. 4, 2003

Related U.S. Application Data

(60) Provisional application No. 60/353,619, filed on Feb. 1, 2002.

(51) Int. Cl.
*B23Q 3/00* (2006.01)

(52) U.S. Cl. ................... 269/296; 269/289 R
(58) Field of Classification Search ............... 269/296, 269/289 R, 27, 32, 24, 309, 310
See application file for complete search history.

(56) References Cited

U.S. PATENT DOCUMENTS

| | | | | |
|---|---|---|---|---|
| 4,743,001 A | * | 5/1988 | Craft | 269/22 |
| 4,934,672 A | * | 6/1990 | Craft | 269/22 |
| 5,957,443 A | * | 9/1999 | Mascola | 269/22 |
| 6,371,469 B1 | * | 4/2002 | Gray | 269/48.1 |

* cited by examiner

*Primary Examiner*—Lee D. Wilson
(74) *Attorney, Agent, or Firm*—Van Dyke, Gardner, Linn & Burkhart, LLP

(57) ABSTRACT

A modular fixturing apparatus component includes a body and a locator mechanism. The locator means is supported in the body for linear movement along the longitudinal axis of the body and for rotational movement about the longitudinal axis. The locator mechanism is provided to locate a center of an opening in an article undergoing inspection or the like. The modular fixturing apparatus component further includes a support surface that is provided at the body and that provides support for the article along the longitudinal axis. In this manner, when the component is mounted to a modular fixturing base plate, the fixturing apparatus component of the present invention provides a datum hole locator mechanism with a sliding action along the Z-axis and, further, provides Z-axis support for the article undergoing inspection or the like. Optionally, the locator mechanism may be rotationally locked to provide an additional, rotational restraint to the article undergoing inspection.

22 Claims, 14 Drawing Sheets

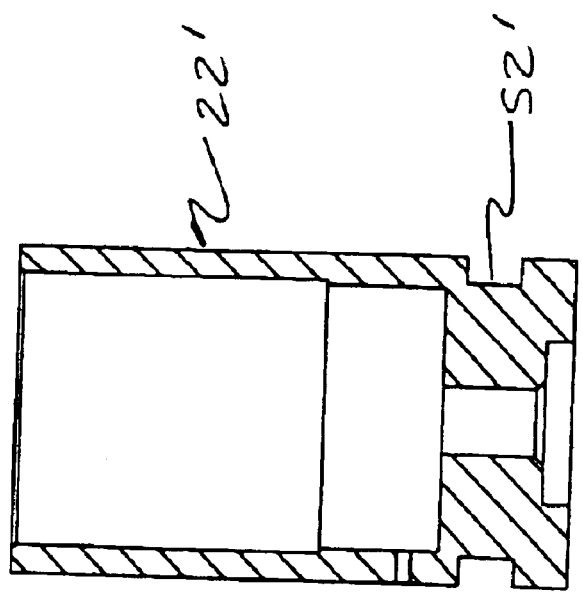
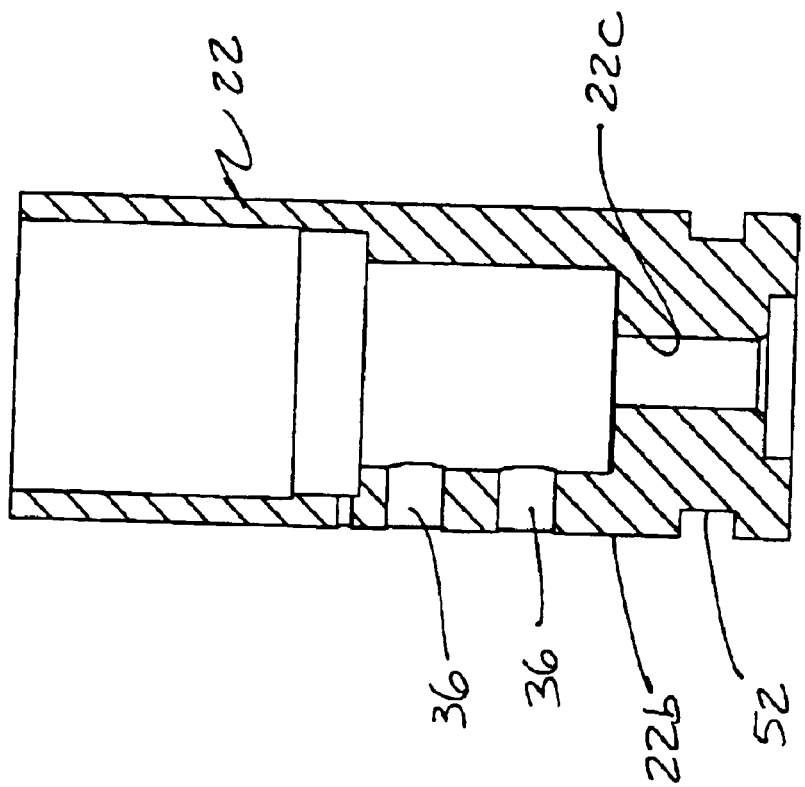

MODULAR TOOLING APPARATUS WITH TAPERED LOCATER SYSTEM

TECHNICAL FIELD AND BACKGROUND OF THE INVENTION

The present invention relates to a fixturing apparatus and, more particularly, to a modular fixturing apparatus used to support an object undergoing manufacturing, inspection, or testing processes or the like. The invention is particularly suitable for supporting or holding a part or component undergoing quality control inspection by a coordinate measuring machine (CMM) and may also be used to support or hold objects undergoing light to moderate manufacturing processing, such as assembling, soldering, laser-jet and water-jet cutting, welding, light-machining, or the like.

A typical modular fixturing apparatus includes a platform or base plate and a series of fixturing components that can be mounted to the base plate to provide support and leveling for the part undergoing inspection. The base plate includes a plurality of mounting openings that permit the fixturing components to be secured to the base plate in a variety of different locations to hold a variety differently sized and shaped parts. These fixturing components include, for example, risers, spacers, clamps, including vacuum-based clamps, springs, fasteners, magnets, and the like which may be arranged on and secured to the base plate in a number of different configurations in order to allow a particular object to be supported and, in some cases, secured to the base plate. Furthermore, these fixturing components can be disassembled and reassembled so that the fixturing components can be reused in different configurations on the same or another base plate to create different fixture configurations to accommodate a variety of parts, ranging from, for example, a computer part to an airplane part.

Many parts have locator holes that are used as datums from which measurements are to be taken. Since the holes have their own tolerances, fixturing apparatuses use the center of the hole as the actual datum rather than the edge of hole. Furthermore, these holes vary in size with each type of part. In order to locate the center of these holes and accommodate these variations in hole sizes, universal hole locators have incorporated sliding pins with tapered ends to provide adjustable locating surfaces. However, these universal hole locators have provided limited support to the part undergoing inspection. Therefore, the number of components to set-up the part for inspection or the like increases with each locator hole. When setting up a fixturing apparatus, an increase in the number of components to hold and set up the part increases the set-up time and hence the cost of the process. Moreover, the weight of the fixturing apparatus increases.

Consequently, there is a need to provide an improved locator system that will locate the center of the datum holes while providing a holding function along at least one axis to minimize the number of fixturing components needed to set up the fixturing apparatus.

SUMMARY OF THE INVENTION

The present invention overcomes the difficulties of the prior art by providing a modular fixturing system which is capable of supporting objects, even large objects, having a wide variety of shapes or configurations and, more particularly, is capable of locating the center of datum holes while providing a leveling function, which minimizes the number of components. This is achieved by providing a sliding pin or locator means with one or more tapered surfaces and a Z-adjustment member. In addition, the present invention provides a locking feature that rotationally locks the sliding pin, which can restrain the part undergoing inspection from rotation.

According to one form of the invention, a modular fixturing component includes a body having a longitudinal axis and a locator means, which is supported in the body for linear movement along the longitudinal axis and rotational movement about the longitudinal axis. In this manner, the component provides a sliding locator means along the Z-axis which is used for locating a center of an opening of an article that is to undergo inspection or the like. The component further includes a support surface that provides support for the article along the longitudinal axis of the body to provide Z-axis support to the part undergoing inspection or the like.

In one aspect, the support surface is adjustable along the longitudinal axis and, therefore, provides a Z-axis adjustment to the support surface.

According to another aspect, the component further includes a bushing that is mounted to the body and provides the support surface. For example, the bushing may include a threaded portion, which mounts the bushing to the body and, further, provides adjustment to the support surface along the longitudinal axis of the component body to thereby provide the Z-adjustment.

In another aspect, the body includes an annular groove, which is adapted for receiving a clamp for securing the component to a base plate.

According to yet another aspect, the component further includes a means for limiting rotation of the locator means about the longitudinal axis of the body. In this manner, the locator means may be used to limit rotation of the part about the Z-axis. For example, the means for limiting rotation may comprise at least one set screw and, preferably, comprises a plurality of set screws. For example, the set screw may extend through the body of the component to fix the locator means about the longitudinal axis of the body. In a further aspect, the means for limiting rotation further comprises a collar. The locator means is support in the collar, which permits the locator means to move linearly along the longitudinal axis but when engaged by the screw limits rotation of the locator means about the longitudinal axis.

In yet another aspect, the locator means includes at least one tapered surface for locating the opening. For example, the tapered surface may comprise a conical surface, including a frusto-conical surface.

It can be appreciated that the fixturing component of the present invention provides a hole locator that also provides support along the Z-axis to the part undergoing inspection. In addition, the Z-axis support may be adjusted to accommodate a variety of parts. Furthermore, the component may be modified so that the locator means can limit rotation of the part undergoing inspection.

These and other objects, advantages, and features of this invention will become apparent upon review of the following specification in conjunction with the drawings.

BRIEF DESCRIPTION OF THE DRAWINGS

FIG. 6 is a cross-section of the body of the fixturing component of FIG. 5;

FIG. 8 is a cross-section of the body of the fixturing component of FIG. 7;

DESCRIPTION OF THE PREFERRED EMBODIMENTS

Referring to FIGS. 1–4, the numeral 10 generally designates a modular fixturing apparatus of the present invention. Modular fixturing apparatus 10 includes a base plate or platform 12 and plurality of fixturing components 14, 16, 18, and 20 (FIGS. 18 and 19) that are mounted to platform 12 for leveling and supporting an object, such as a part. Platform 12 includes a plurality of mounting openings 12*a* which are spaced at intervals along two axes, namely the X and Y axes, to provide a coordinate or locator system for measuring or locating the part undergoing inspection or the like. In the illustrated embodiment, components 14 and 16 comprise datum hole or slot locators and, further, provide a support surface on which the part being inspected maybe leveled and onto which the part may be clamped to provide both upward and downward (+ or −Z) restraint to the part. In addition, as will be more fully described below, components 14 and 16 may be used to limit rotation of the part undergoing inspection or the like. It can be appreciated that by providing a support surface in combination with a datum hole locator as well as providing a means to limit rotation of the part undergoing inspection in a single fixturing component, the number of components required for set-up of the part for inspection or the like is reduced, hence saving time and cost.

Figure 5:
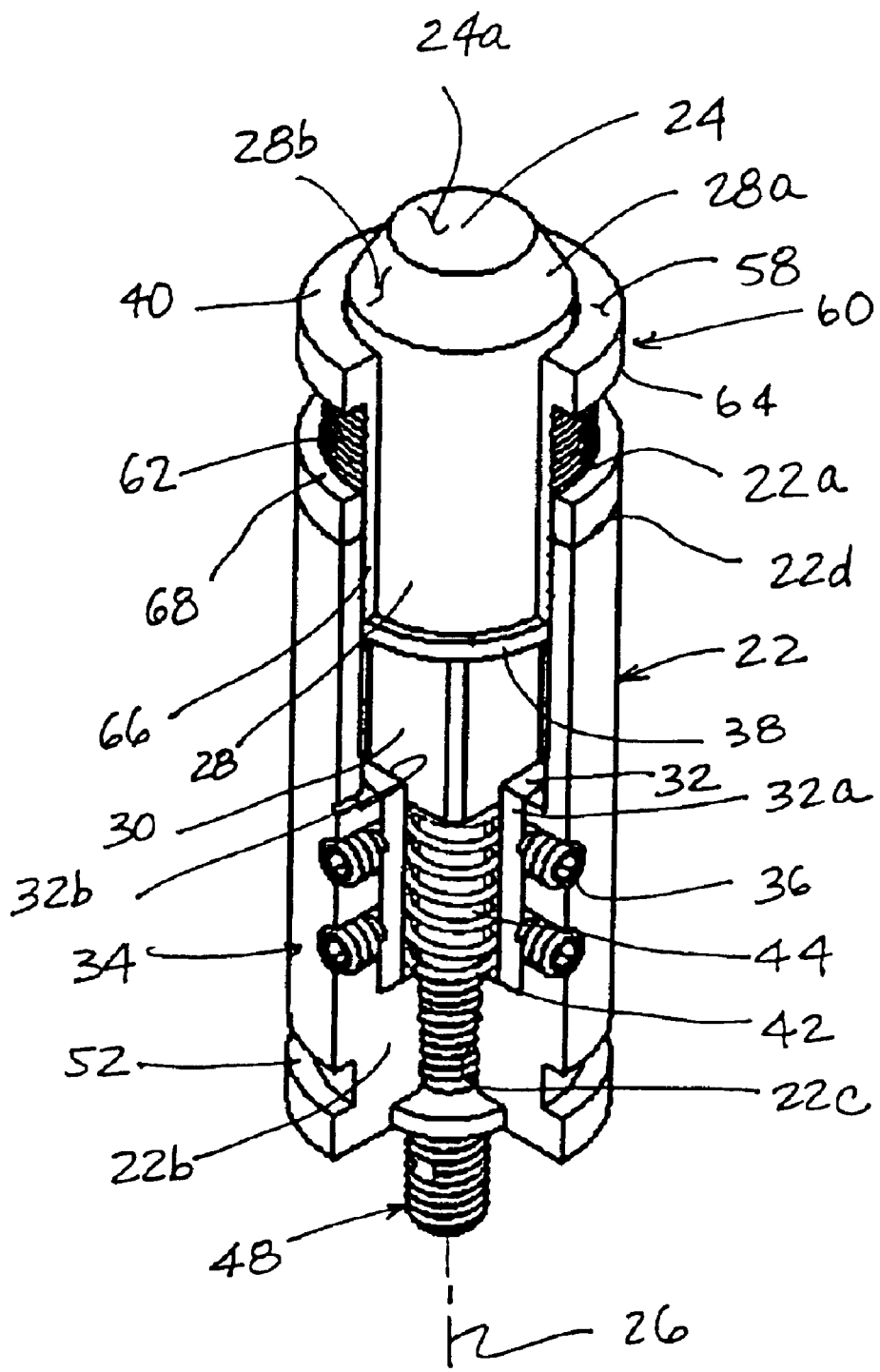
FIG. 5 is a fragmentary perspective view of one of the datum locator and leveling fixturing components of FIG. 4.

Referring to FIG. 5, component 14 comprises a datum locator and leveling fixturing component and includes a cylindrical body 22 and a locator means, such as a pin 24. Pin 24 is mounted in body 22 through an upper opening 22*a* and is mounted for limited vertical movement along and limited rotational movement about the longitudinal axis 26 (Z-axis) of body 22. Pin 24 has an upper body portion 28 and a lower body portion 30. Upper body portion 28 comprises a cylindrical shaped body with a frusto-conical end 28*a* or tip with a generally planar distal end 24*a*. Lower body portion 30 comprises a tubular body with a non-circular cross-section, such as a square or rectangular cross-section, which is used to limit rotation of pin 24 about vertical axis 26, as will more fully described below.

Positioned in cylindrical body 22 is a cup or collar 32 that includes a cylindrical outer surface 32*a*, which is commensurate in size with the inner surface of body 22 to provide a relatively close fit within cylindrical body 22, and a non-circular inner surface 32*b* that is commensurate in shape and size to receive lower body portion 30 of pin 24 and to provide a relatively close fit with lower body portion 30 of pin 24. In this manner, when pin 24 is inserted into collar 32 and collar 32 is inserted into body 22, pin 24 and collar can 32 rotate about axis 26 in body 22. In order to limit rotation of collar 32 and, therefore, pin 24 about axis 26, component 14 includes at least one set screw 34 and, preferably, a plurality of set screws or other means for setting the position of collar 32 with respect to body 22 about axis 26. Set screws 34 extend through holes 36 provided in body 22 to contact collar 32. When screws 34 are tightened against collar 32, as would be understood by those skilled in the art, collar 32 is fixed with respect to body 22 about axis 26 to thereby rotationally lock collar 32. In turn, by its not circular-interface with collar 32, pin 24 is also rotationally locked so that it cannot rotate in body 22 about axis 26. In this manner, when component 14 is positioned below a datum hole or slot, pin 24, in addition to providing a centering function, can provide a rotational restraint to the part when used in conjunction with another hole locator. For example, by way of reference to FIG. 1, when component 14 is used in conjunction with a second hole locator, such as component 14, and pin 24 is fixed about the Z-axis, the part will be restrained in the X-Y plane about the Z-axis.

Figure 1:
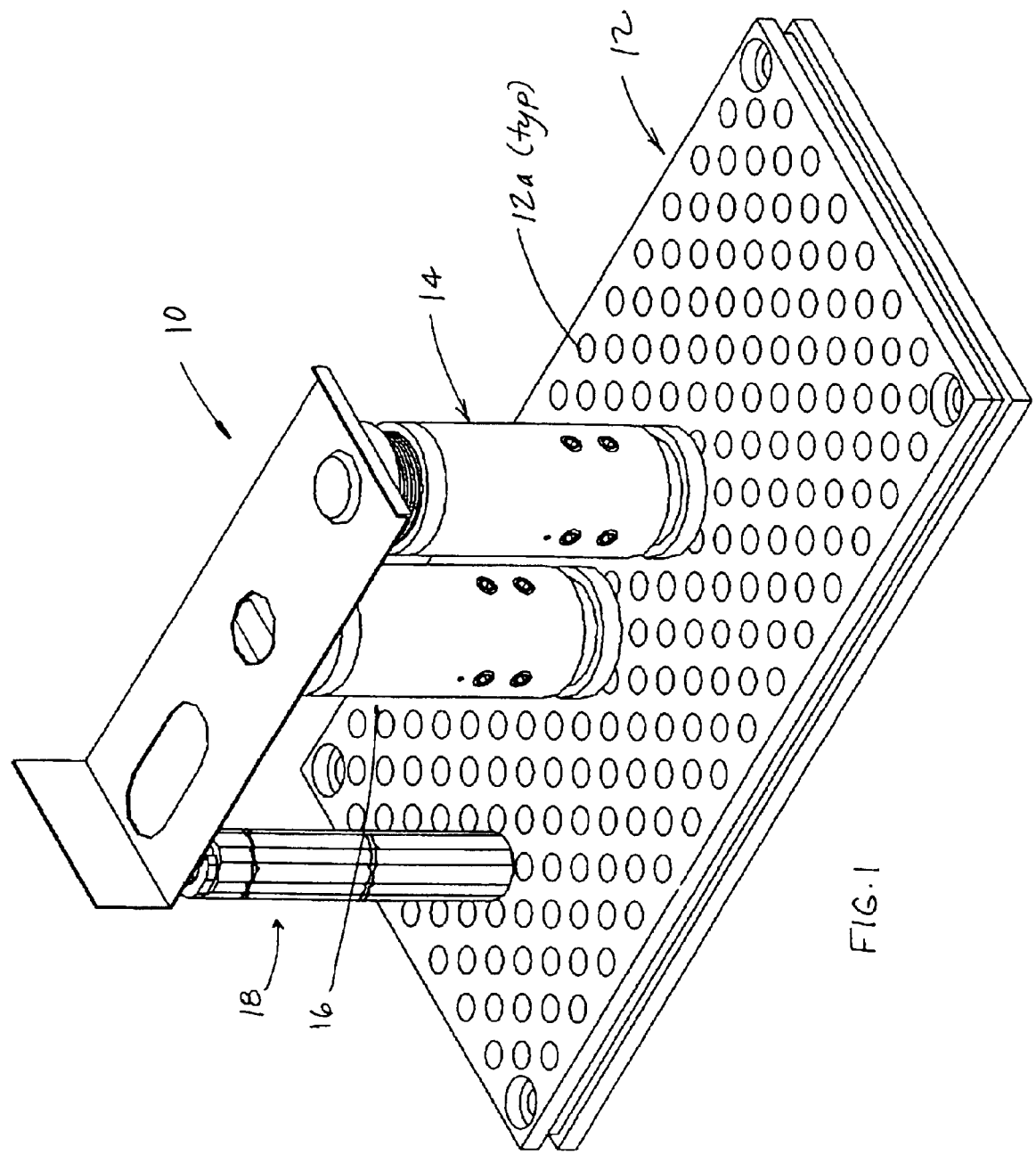
FIG. 1 is a perspective view of a modular fixture apparatus according to the present invention with the fixturing apparatus supporting an object.
Figure 2:
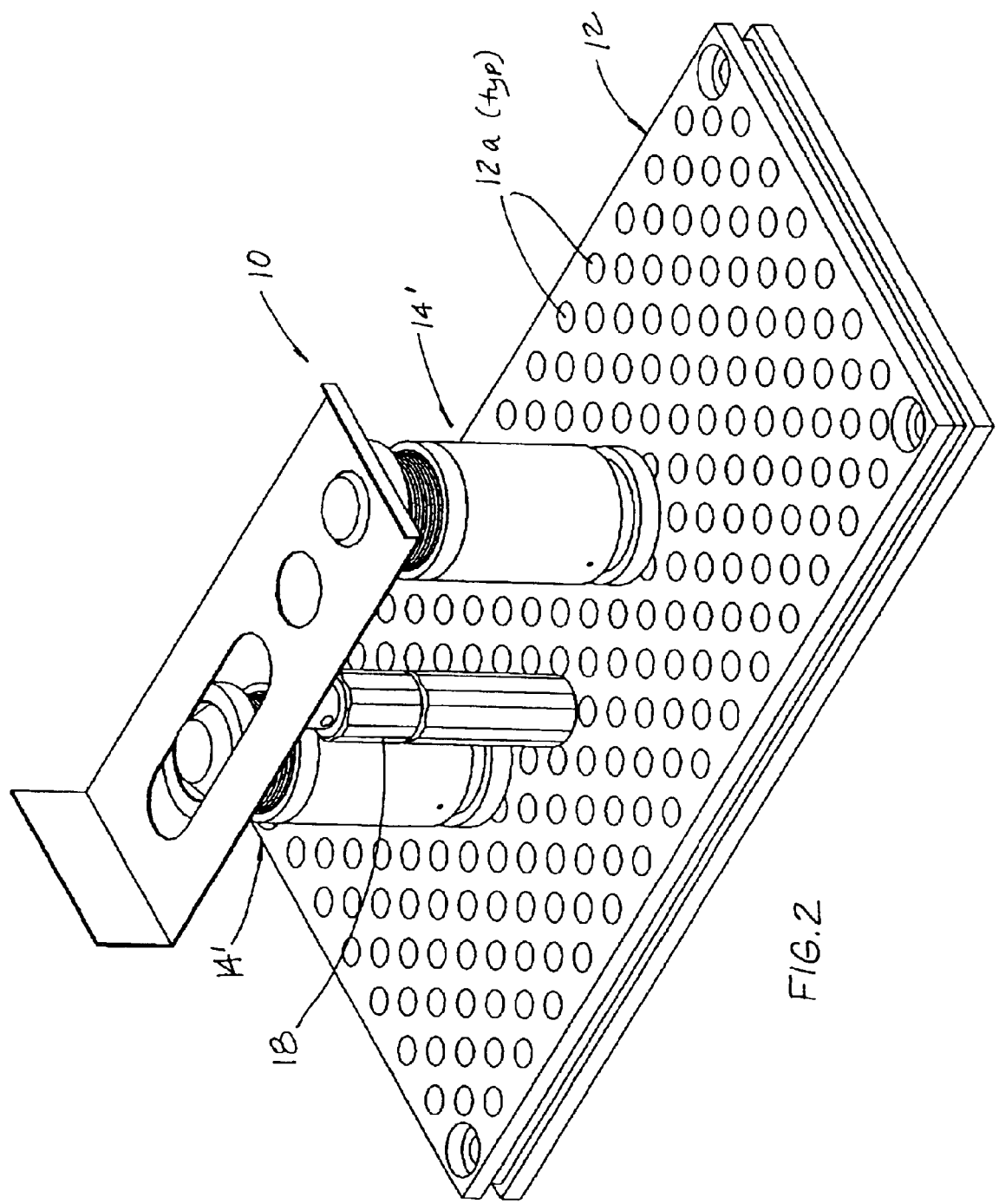
FIG. 2 is a perspective view of the modular fixture apparatus incorporating another configuration of fixturing components.
Figure 3:
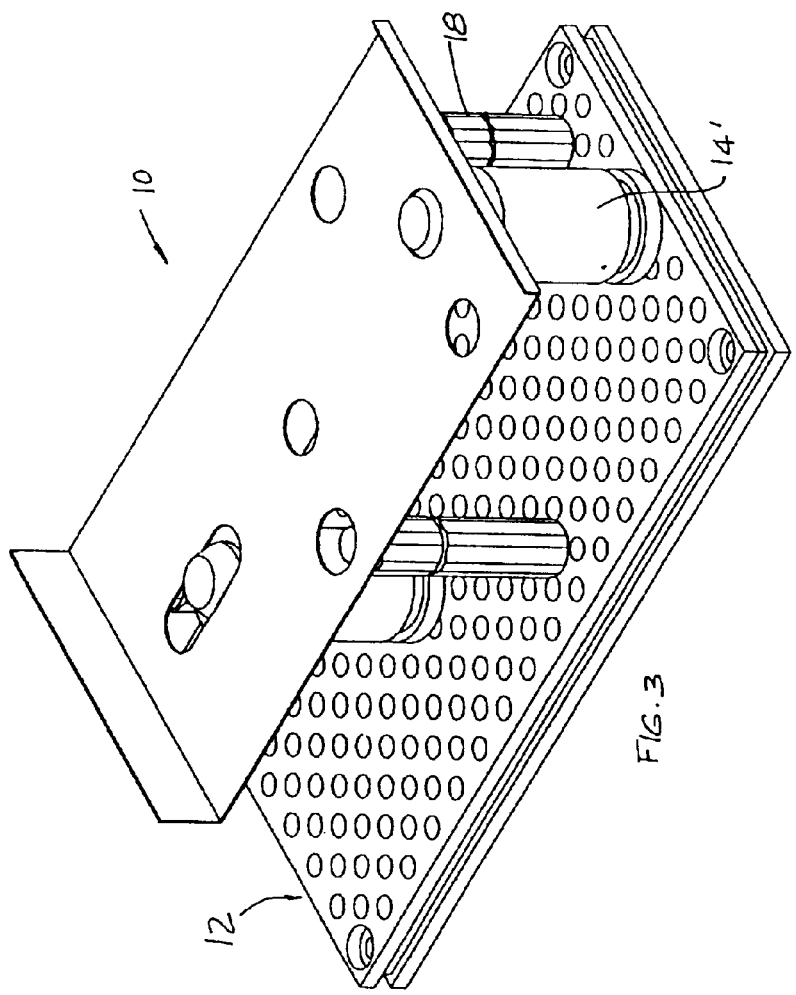
FIG. 3 is a perspective view of the modular fixture apparatus incorporating a third configuration of fixturing components supporting another object.
Figure 4:
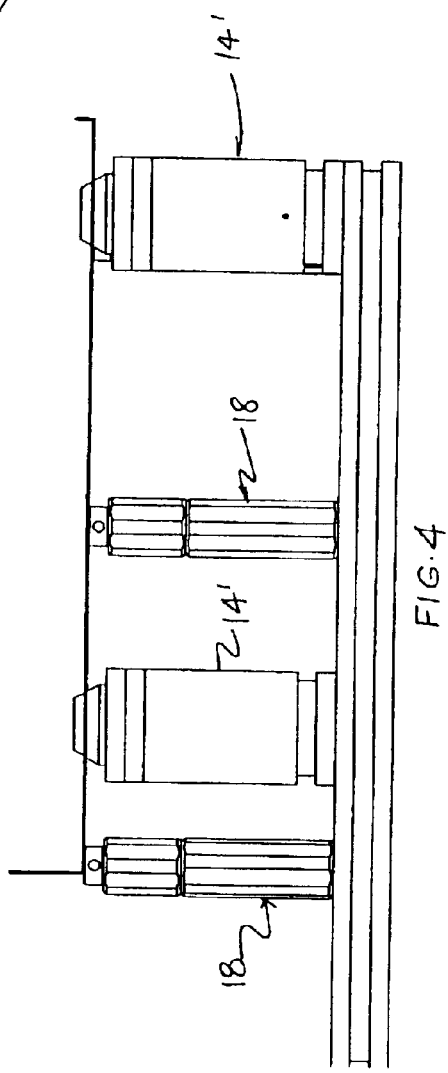
FIG. 4 is a side elevation view of the fixturing apparatus of FIG. 1.

As noted above, pin 24 is mounted for limited vertical movement in body 22 along axis 26. Disposed at the distal end of lower body portion 30 is a flange 38, which provides a stop for pin 22, as will be described in reference to bushing 40. Pin 24 is extendable through body 22 and through opening 22*a* and is urged in an extended position by a spring 42, which is housed in body 22 below pin 24. In this manner, pin 24 exhibits a sliding action in body 22 so that its tapered surface meets the part and locates the center of the datum hole or slot. Thus, when a part is placed on component 14, pin 24 will compress until pin 24 is aligned under a locator or datum hole or slot. After pin 24 is located under a hole, spring 42 will urge pin 24 to slide up or extend until its tapered surface makes contact with either both sides of a slot (as shown in FIG. 2) or until it makes substantially full contact with the perimeter of the datum hole (FIGS. 1–3). In this manner, the tapered, conical surface 28*b* of the frusto-conical end will provide a centering function while accommodating holes of different sizes. Therefore, pin 24 provides an adjustable locating surface.

In order to maintain the alignment of spring 42, component 14 includes a guide pin or rod 44 that extends through spring 42 and is threaded into base 22*b* of body 22. Base 22*b* includes a threaded opening 22*c* which receives guide pin 44 and into which a threaded coupler 48 is threaded for mounting component 14 to one of the mounting openings 12a of platform 12. Threaded coupler 48 preferably comprises a double-headed fastener, such as described in U.S. Pat. No. 5,887,733, which is incorporated by reference herein in its entirety.

Figure 17:
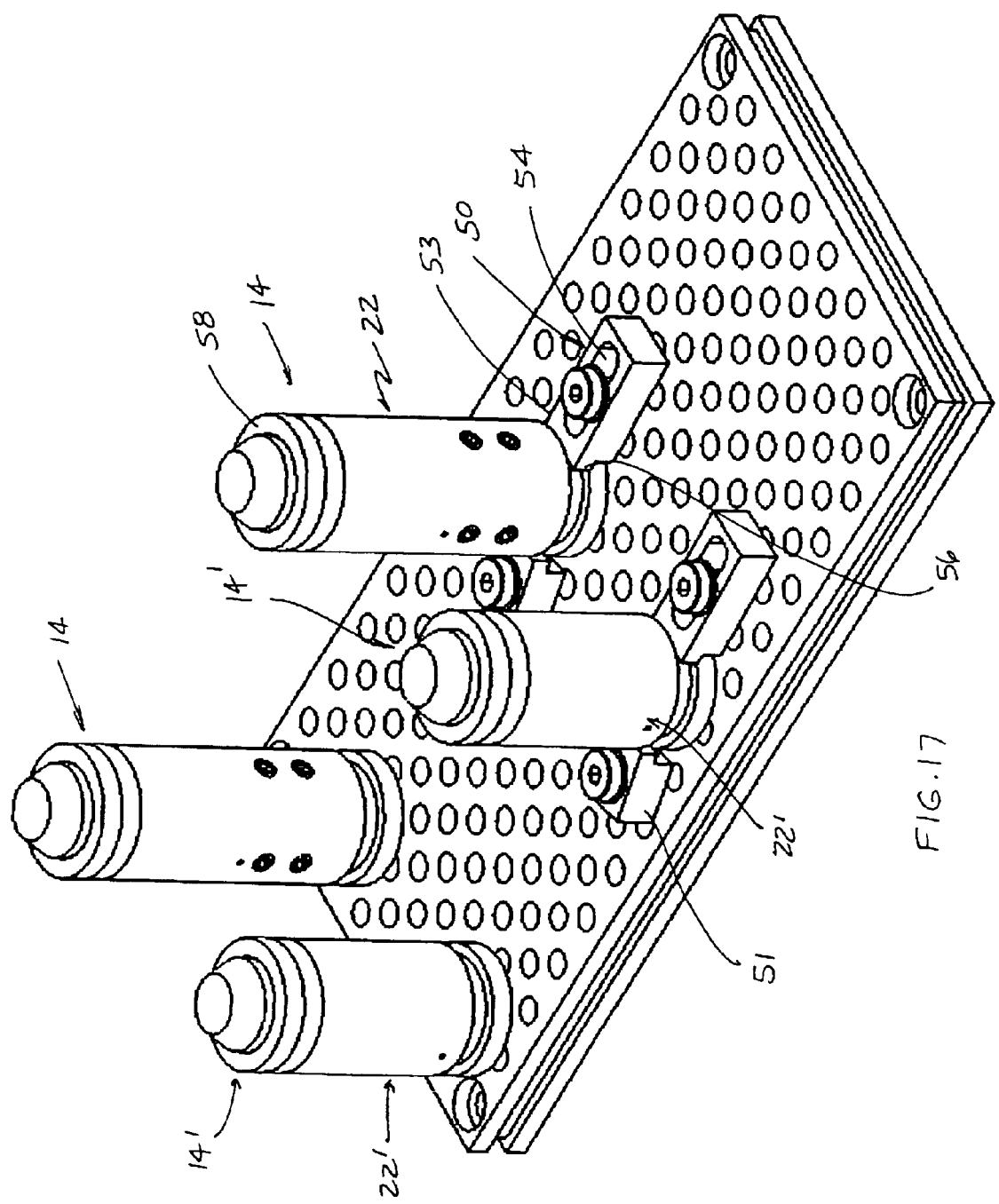
FIG. 17 is a perspective view of the modular fixture apparatus illustrating two different embodiments of the locator and leveling fixturing components of FIGS. 5 and 7, and two different mounting arrangements for the fixturing components.

Alternately, component 14 may be mounted to platform 12 by a pair of clamps 50 (FIG. 17). Clamps 50 are particularly useful when component 14 is to be mounted to platform 12 offset from its mounting openings. For example, in the illustrated embodiment, the spacing of mounting openings 12a is based on English units of measurement. However, some parts are built based on Metric units of measurement; therefore, the spacing of the mounting openings may not accommodate such parts. Furthermore, parts may have dimensions that fall between the spacing of the mounting openings. Therefore, clamps 50 increase the range of parts that can be set up on apparatus 10 thereby providing increased flexibility to platform 12.

As best seen in FIG. 5, body 22 includes an annular groove 52, which provides a gripping or holding surface for clamps 50 and 51. Referring to FIG. 17, each clamp 50 comprises a bar or plate 53 with an elongated opening 54 through which a mounting fastener secures the clamp 50 to platform 12 in a mounting opening. In addition, each clamp 50 includes a flange or lip 56 that engages groove 52 to thereby clamp component 14 to platform 12. The elongate openings allow for lateral adjustment of the clamp and, therefore, as noted above, allow adjustment of component 14 across platform 12 to accommodate a wide range of part dimensions, including Metric parts. Clamps 51 are of similar construction to clamps 50 but are not adjustable in length. Though it should be understood that both clamps may comprise adjustable clamps.

In addition to providing a centering function with pin 24, component 14 also provides an adjustable support surface 58 in the vertical direction or Z-axis. As used herein the Z-axis is perpendicular to the platform and to the X- and Y-coordinate system provided by the mounting openings in platform 12. Support surface 58 is provided by a bushing 60, which is mounted to body 22. Bushing 60 comprises a cylindrical body 62 with an enlarged annular flange 64 and a threaded base 66, which threadingly engages the inner surface of body 22 to provide adjustment to bushing 60 along axis 26. To fix the position of bushing 60, bushing 60 includes a threaded locking ring 68 mounted on its threaded base 66, which when threaded against the top surface 22d of body 22 fixes bushing 60 in place. In this manner, after the center of the datum hole is located by pin 24 and pin 24 is in position in the datum hole, the height of bushing 60 can be adjusted to provide vertical support to the part. In addition, bushing 60 provides an abutment for flange 38 of pin 24 so that the pin's fully extended position is limited by the lower edge of bushing 60. Flange 64 and/or locking ring 68 may include a high friction surface, such as a knurled surface. In this manner, component 14 provides a pin with a sliding action, which provides a centering function, as well as a Z-adjustment so that the support undergoing inspection can be supported along the Z-axis.

It should also be understood that component 14 may also be used as a component that provides vertical support only. When component 14 is positioned under a part with no datum hole or slot, then the part can rest on bushing 60 with pin 24 retracted into body 32 with its generally planar distal end 24a flush with (or below) the support surface 58 of bushing 60. Furthermore, as will be more fully described in reference to FIGS. 20 and 21, the fixturing component of the present invention may be modified to provide a closed support surface.

Referring to FIGS. 2–4 and 7, a second embodiment 14' of the datum locator and leveling fixturing component of the present invention is illustrated. Component 14' is of similar construction to component 14 and includes a cylindrical body 22' and a locator pin 24'. Pin 24' is a truncated version of pin 24 and does not include lower portion 30 of pin 24 to thereby reduce the overall height of component 14. As a result, pin 24' is free to rotate about axis 26'.

Pin 24' comprises a cylindrical body with a generally uniform diameter that is sized to fit inside bushing 60' and has a generally close fit with the inner surface of bushing 60' to limit lateral movement of pin 24' in body 22', but not necessarily limit rotation of pin 24' about axis 26'. Upper end 28' of pin 24' is similar to end 28 of pin 24 and has a frusto-conical shape which provides a tapered, conical locating surface 28a'. The leveling function of component 14' is provided by bushing 60'. Bushing 60', like bushing 60, includes a locking ring 68' and provides an abutment for an enlarged flange 24a' of pin 24' to thereby limit vertical movement of pin 24' in body 22' along vertical axis 26'. In addition, bushing 60' provides an adjustable support surface 58' so that the article undergoing inspection or the like can be supported along the Z-axis.

Pin 24' slides or is urged in its extended positions by a spring 42'. In the illustrated embodiment, spring 42' is sized to have a close fit with the inner surface of body 22', so that the inner surface of body 22' provides a guide for spring 42'. Therefore, the guide pin in component 14 may be eliminated. For the remaining details of bushing 60' and the mounting of component 14', reference is made to the previous embodiment. As would be understood by those skilled in the art, component 14' is a simplified version of component 14 which has fewer components and a more compact configuration.

Figure 5A:
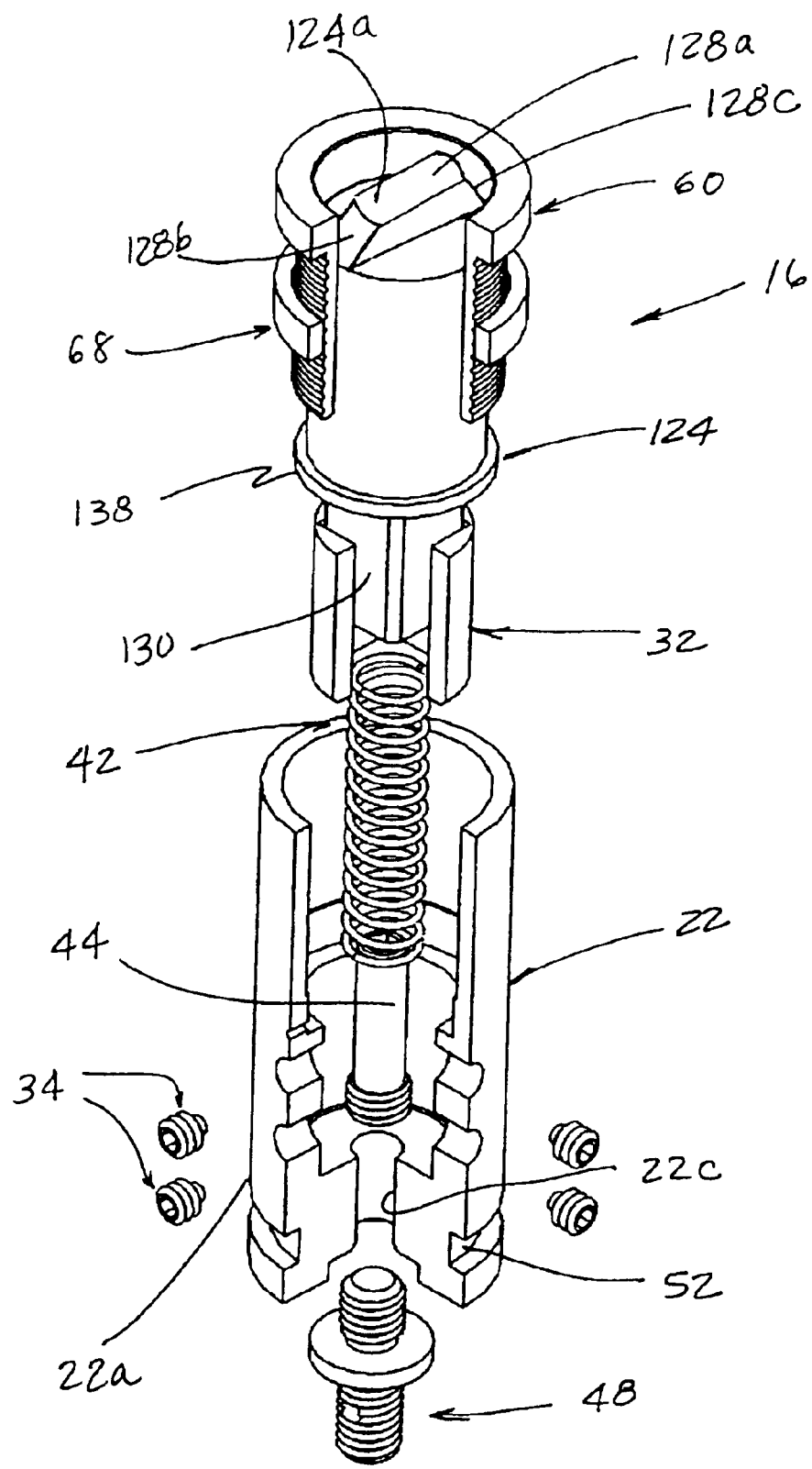
FIG. 5A is a fragmentary exploded perspective view of another embodiment of the fixturing component of the present invention.
Figure 7:
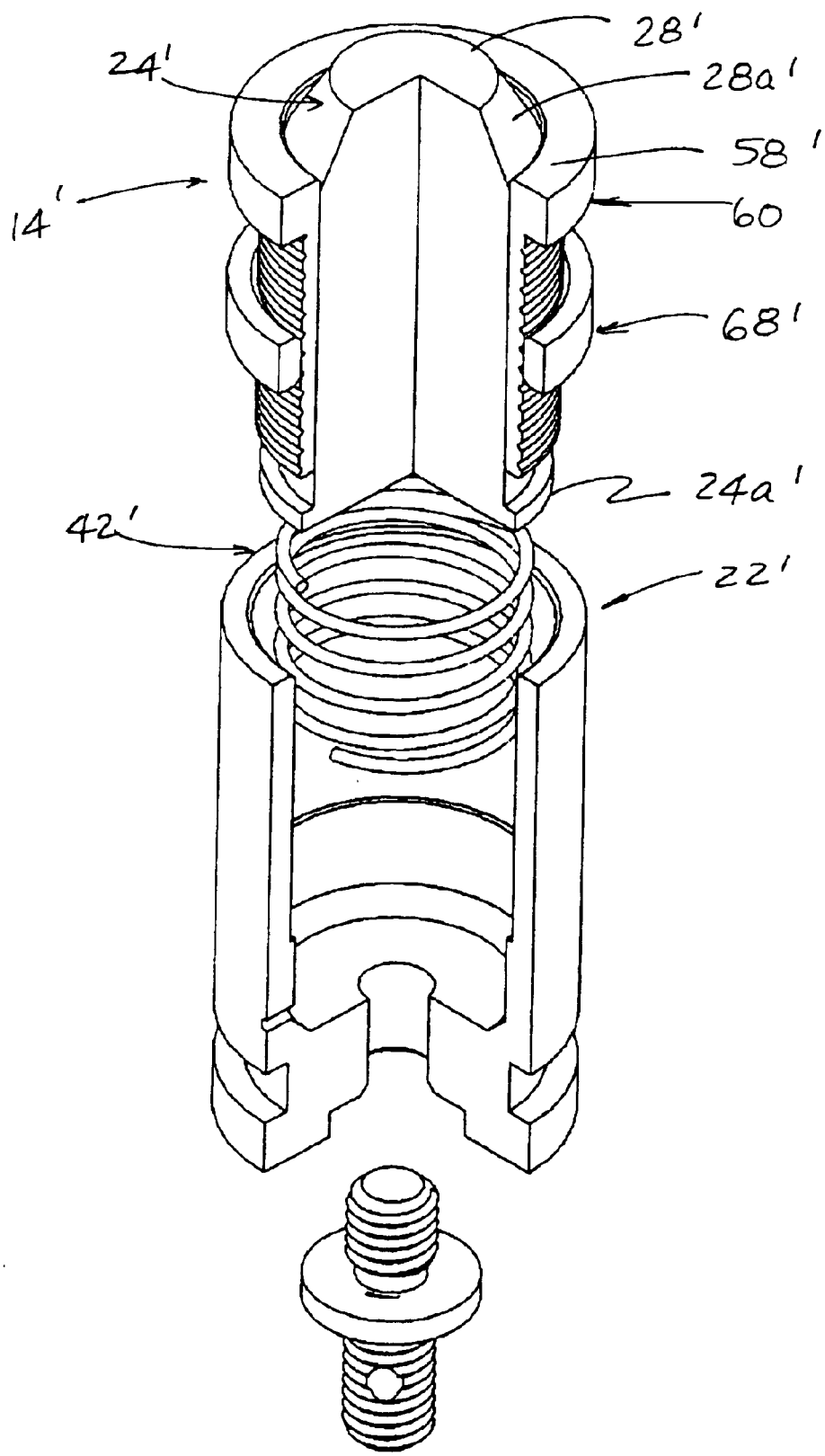
FIG. 7 is fragmentary exploded perspective view of another embodiment of the datum locator and leveling fixturing component of the present invention.
Figures 9, 10:
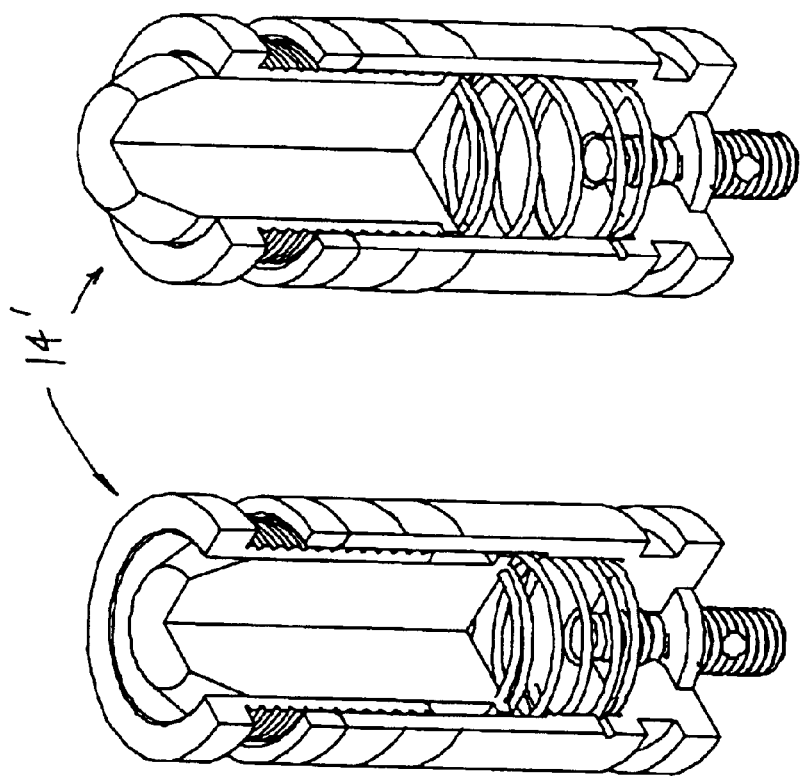
FIGS. 9–12 are fragmentary perspective views of the locator and leveling fixturing component of FIG. 7 illustrating various positions of the fixturing component's pin and bushing.
Figures 11, 12:
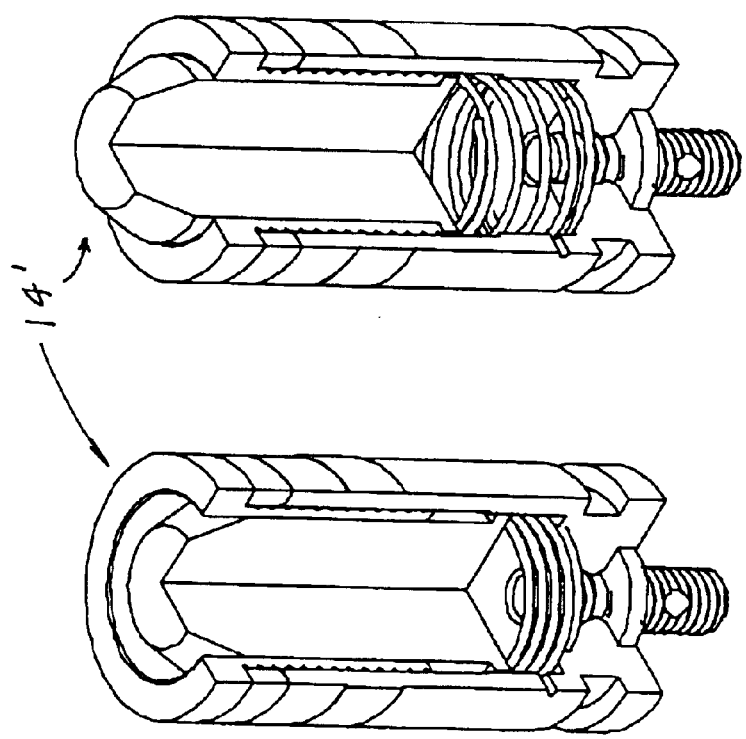
Figure 13:
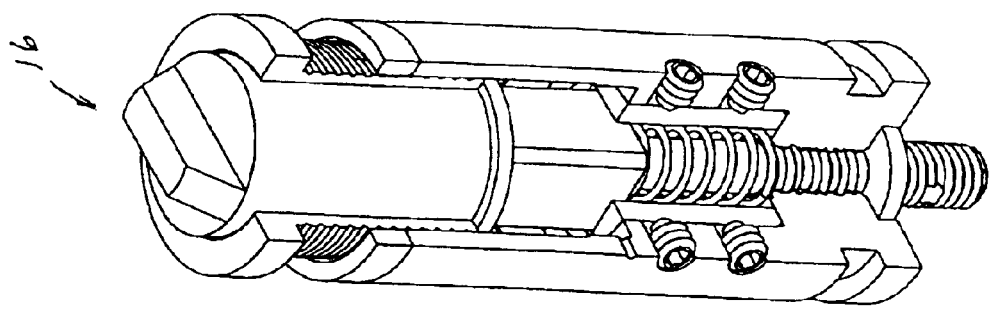
FIGS. 13–16 are fragmentary perspective views of the fixturing component of FIG. 5A illustrating various positions of the fixturing component's pin and bushing.
Figure 14:
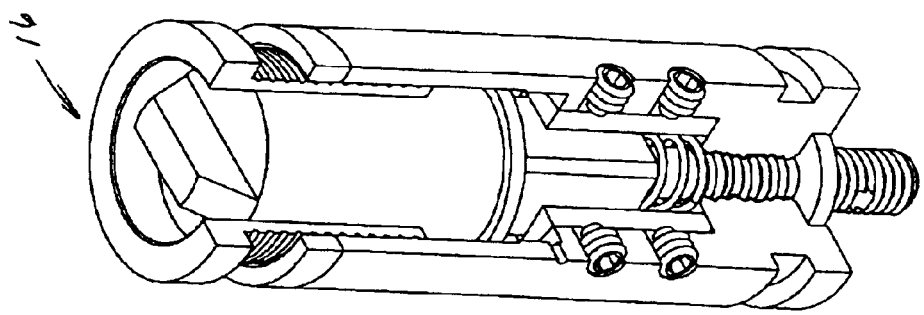
Figure 15:
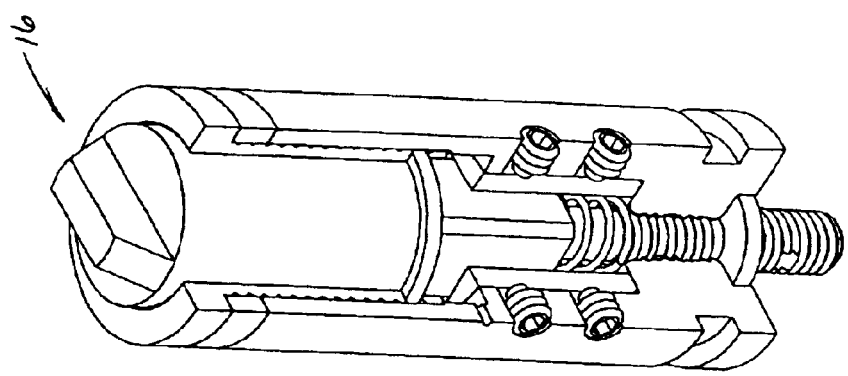
Figure 16:
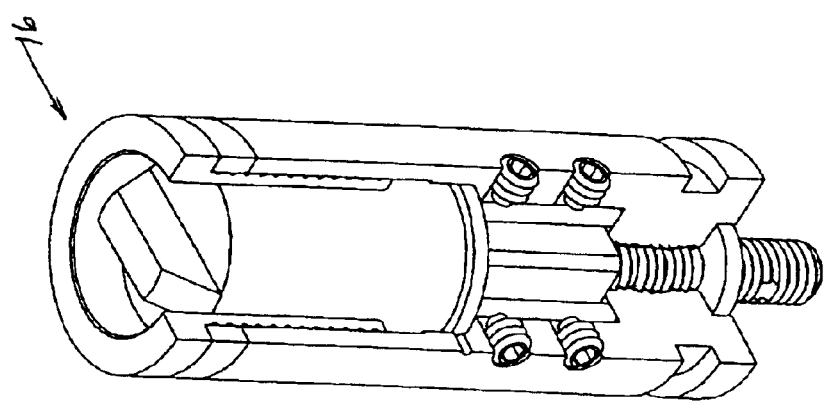

As best seen in FIG. 5A, component 16 is of similar construction to component 14 and includes a pin 124 with an upper portion 128 and a lower portion 130. Upper portion 128 includes a slotted tapered end 128a with opposed tapered surfaces 128b and 128c, which are segments of a conical surface, and a generally planar distal end 124a. Similar to pin 24, lower portion 130 of pin 124 has a non-circular cross-section so that pin 124 can be mounted in body 22 for limited rotational movement about axis 26 in a similar manner to pin 24. In addition, lower portion 130 includes an enlarged flange 138 so that pin 124 is mounted limited vertical movement (or limited movement along the Z-axis). For details of the remaining elements of component 16, reference is made to component 14.

Figure 18:
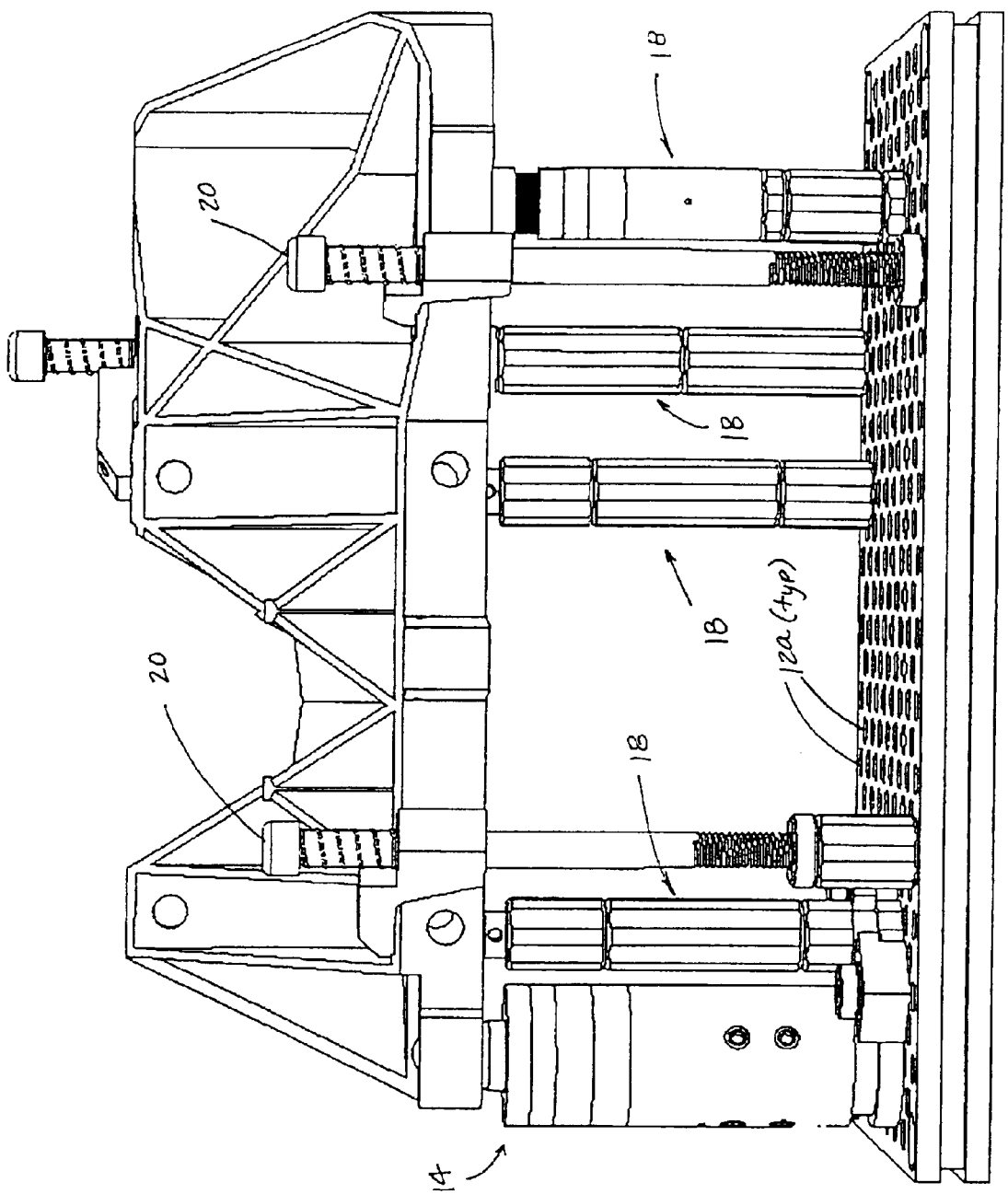
FIG. 18 is an elevation of yet another arrangement of the locating and leveling fixturing component of FIG. 15 in combination with other fixturing components.

In setting up a part, component 16 is particularly useful for locating the center of a second or tertiary datum, such as a second hole or a slotted opening (shown in FIGS. 1 and 18). By providing a two-point contact with the second datum, the centering components can accommodate the part-to-part variations that exist between the two datum holes. Since the second hole is used to set rotation of the part, it is advantageous to rotate pin 124 until surfaces 128b and 128c are aligned along an axis that is perpendicular to the axis of rotation and thereafter lock or fix the position of pin against rotation. As described in reference to component 14, pin 124 may be fixed or locked about axis 26 by setscrews 34.

Depending on the part size and configuration, fixturing apparatus 10 may also include one or more leveling components, such as component 18 (FIGS. 1–4, 18, and 19).

Leveling component 18 includes one or more tubular members that may be stacked, as needed, to provide vertical support to the part being set-up on apparatus 10. In order to fix the vertical position of the part, one or more components 14, 16, or 18 may have associated therewith a clamp component, such as component 20 (FIG. 18), which applies a downward (−Z) force in the part. Clamping components 20 are used to restrain the part in at least the downward direction and also to overcome the upward force applied by pins 24, 24', and 124.

Figure 20:
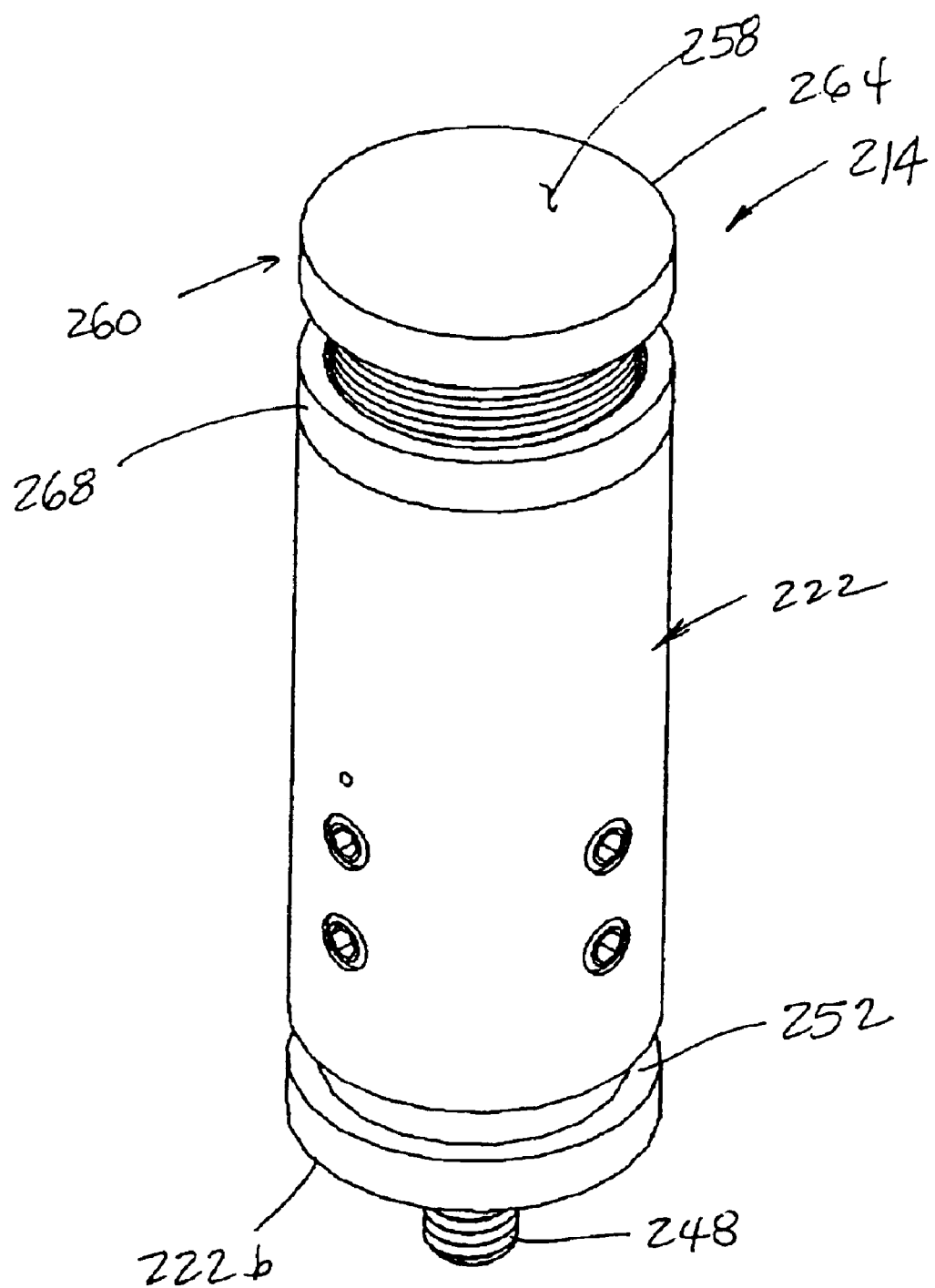
FIG. 20 is a perspective view of another embodiment of the fixturing component of the present invention.

Referring to FIG. 20, the numeral 214 designates another embodiment of the fixturing component of the present invention. Fixturing component 214 is of similar construction to fixturing component 14 or 16 and includes a cylindrical body 222 and a support surface 258. Similar to body 22, body 222 includes an annular groove 252 that permits component 214 to be mounted to a mounting plate, such as plate 12, at locations other than the mounting openings, for example, using clamps 51 and/or 50. Alternately, fixturing component 214 may be mounted to threaded mounting holes or openings of a mounting plate (such as openings 12a of mounting plate 12 discussed in reference to the previous embodiments) by a threaded coupler 248, which is mounted into the base 222b of cylindrical body 222 similar to threaded coupler 48. For further details of the mounting of the threaded coupler 248, reference is made to the previous embodiments.

Similar to fixturing components 14, 16, and 14', support surface 258 preferably comprises an adjustable support surface 258 and is provided by a threaded bushing 260 which threads into body 222. Bushing 260 is of similar construction to bushing 6o except that it includes a closed support surface or solid flange 264 that extends across the open end of cylindrical body 222, thus eliminating the need for the locating pin 24 or 24' of the previous embodiments. However, it can be appreciated that the pin may instead be fully retracted into body 222 for later use so that a single component 214 may be used to provide a multitude of different functions with interchangeable accessories. To lock the position of busing 260 in place, component 214 includes an annular locking ring 268, similar to ring 68. Therefore, reference is made to annular ring 68 and the figures depicting annular ring 68 for further details.

Like components 14 and 16, therefore, fixturing component 214 provides an adjustable vertical (or Z) support while using a number of the same components as fixturing component 14 to thereby increase the range of application of the fixturing components of the present invention. In addition, it should be understood, that bushing 260 may be incorporated into the cylindrical body 22' of fixturing component 14' in a similar manner.

Figure 21:
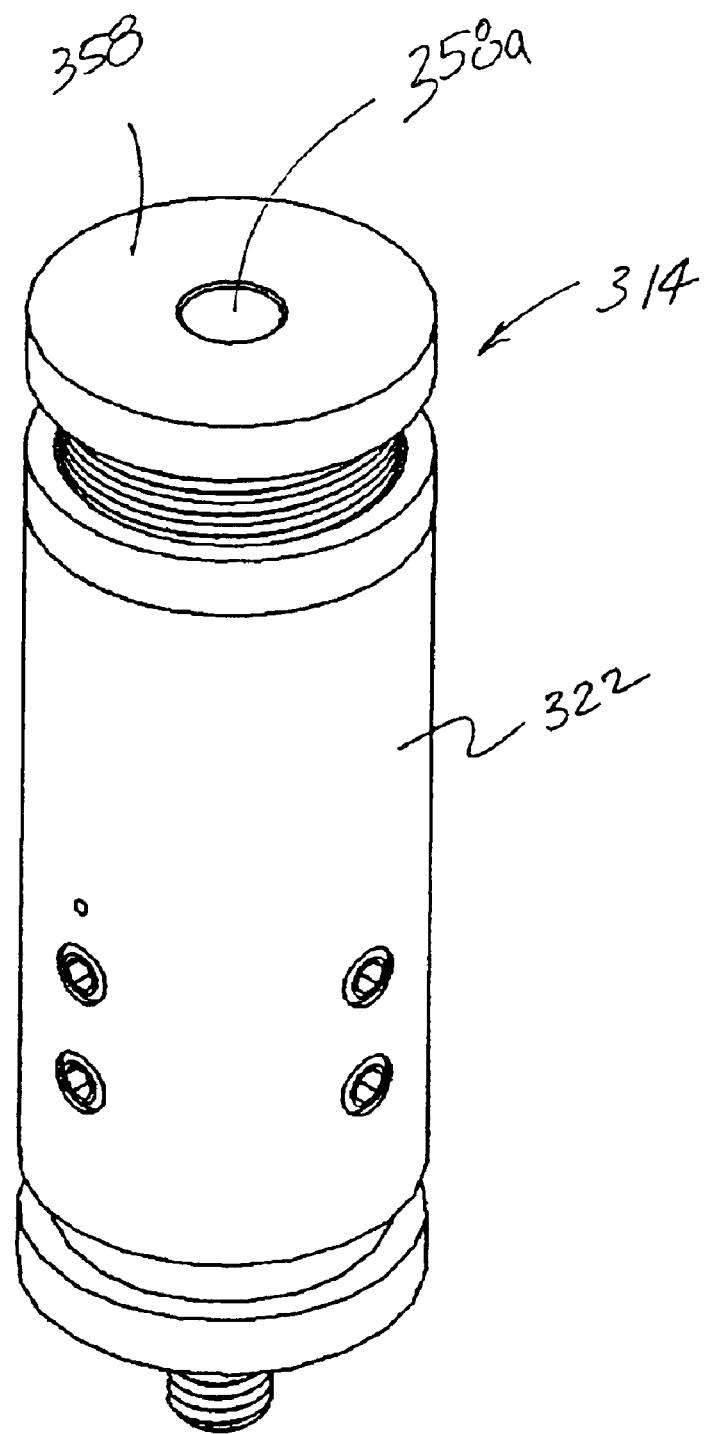
FIG. 21 is a perspective view of yet another embodiment of the fixturing component of the present invention.

Referring to FIG. 21, the numeral 314 designates yet another embodiment of fixturing component of the present invention. Fixturing component 314 is similar to fixturing component 214 with the addition of a mounting opening 358a provided in mounting surface 358, which has a smaller diameter than the diameter of the pin, which may or may not necessarily be eliminated and rather just fully retracted into body 322. In this manner, additional components may be stacked on top of component 314 to provide even further flexibility and greater application for the fixturing component of the present invention. Similar to component 214, component 314 may be assembled using the body of component 14' to provide a shorter component.

The present invention provides for exceptionally flexible fixturing components that combine a datum locating function and a leveling function, as well as a rotation restraint, for parts undergoing inspection or machining or the like. When combined with other commercially available components, the components of the present invention provide a fixturing apparatus that is extremely accurate and can accommodate a wide range of part shapes and sizes. In addition, the fixturing components may be reconfigured to provide even further flexibility. These features and functions are accomplished with a minimum number of components thereby reducing the labor required to design and assemble a fixture, but without sacrificing versatility. By combining several functions in a single component, the fixturing components provide optimal support at desired locations for the object to be supported which may be easily fitted with different size pins or different bushings, etc. to even further expand the flexibility of the components.

Changes and modifications in the specifically described embodiments can be carried out without departing from the principles of the invention, which is intended to be limited only by the scope of the appended claims, as interpreted according to the principles of patent law including the doctrine of equivalents. As previously noted, components 14, 14', and 16 may be used simply to provide vertical support or to simply provide a locating function. Referring to FIGS. 9–13, it can be appreciated that the respective pins may be extended to provide a locating function or retracted below the support surface (provided by the bushing) so that the components provide only vertical support. Alternately, as shown in FIGS. 20 and 21, the pin may be eliminated or may be fully retracted into the body of the component and releasably fixed in its retracted position by a flanged bushing that provides an adjustable support surface.

Figure 19:
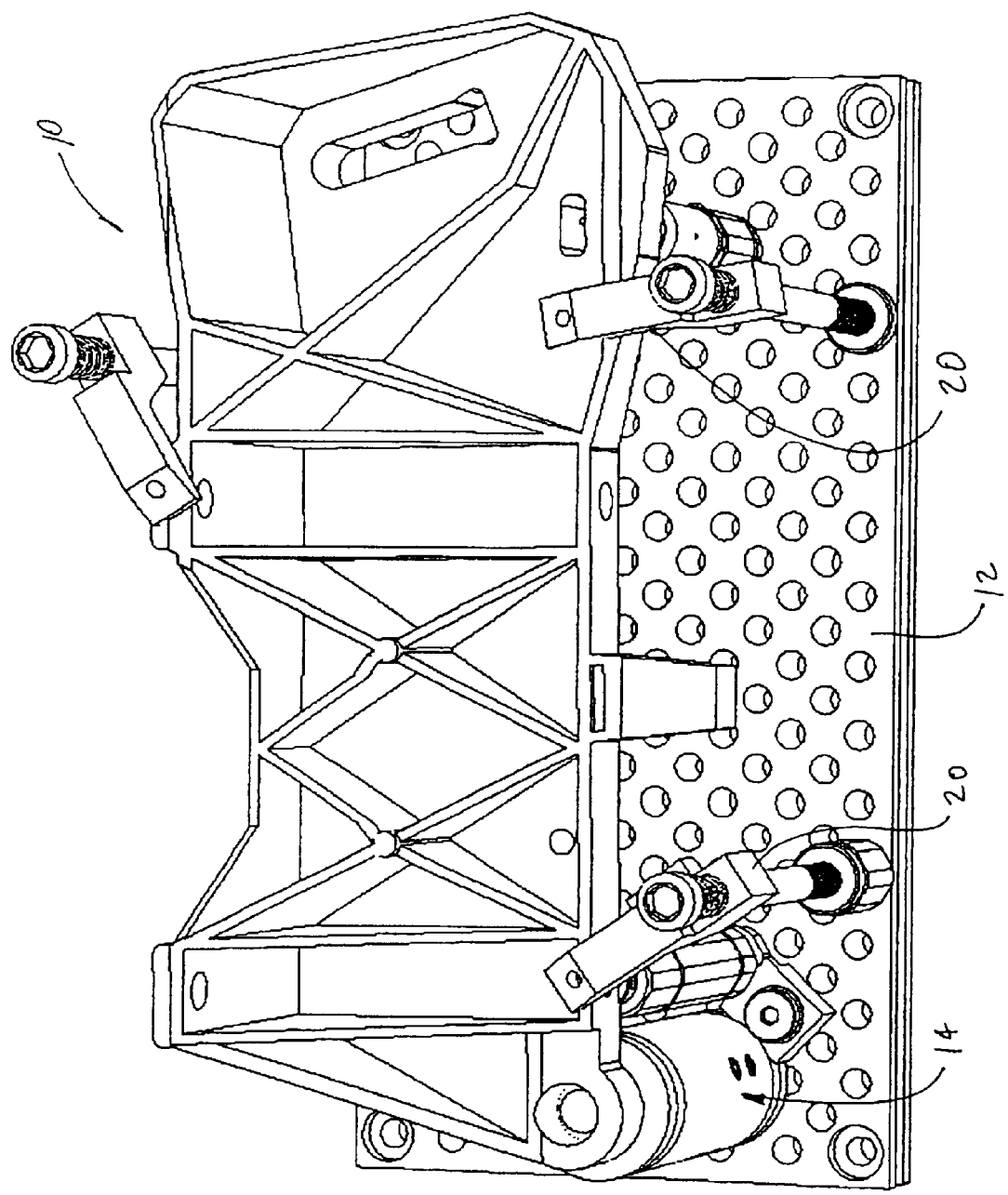
FIG. 19 is a top plan view of the fixturing apparatus of FIG. 18.

It should be understood that the same simplifications made to component 14 may be made to component 16. In other words, the more compact configuration of component 14' may be incorporated into component 16. Furthermore as described in reference to component 14', set screws 34 may be eliminated so that the pins (24 and 124) are free to rotate about axis 26. In which case, the overall height of components 14 and 16 can be reduced by the height of the collar (as shown in FIG. 4A). In addition, although described as having generally planar distal ends, pins 24, 24', and 124 may alternatively have pointed ends, such as shown in FIG. 19. Furthermore, while bushings 60, 60' have been illustrated with generally planar upper support surfaces, these surfaces may be tapered.

The embodiments of the invention in which I claim an exclusive property or privilege are defined as follows:

1. A modular fixturing apparatus component comprising:
   a body having a longitudinal axis;
   locator means supported in said body for linear movement along said longitudinal axis and rotational movement about said axis, said locator means for locating a center of an opening in an article;
   a support surface provided at said body, said support surface providing support for the article along said longitudinal axis; and
   means for limiting rotation of said locator means about said longitudinal axis, wherein said means for limiting rotation comprises at least one screw, said screw extending through said body to fix said locator means about said longitudinal axis.

2. The modular fixturing apparatus component in claim 1, wherein said support surface is adjustable along said longitudinal axis.

3. The modular fixturing apparatus component in claim 1, further comprising a bushing, said bushing mounted to said body and providing said support surface.

4. The modular fixturing apparatus component in claim 3, wherein said bushing includes a threaded portion, said threaded portion mounting said bushing to said body and providing adjustment to said support surface along said longitudinal axis.

5. The modular fixturing apparatus component in claim 1, wherein said body comprises a cylindrical body.

6. The modular fixturing apparatus component in claim 1, wherein said body comprises a cylindrical body.

7. The modular fixturing apparatus component in claim 1, wherein said means for limiting rotation further comprises a collar, said collar adapted to limit rotation of said locator means about said longitudinal axis but permit said locator means to move lineraly along said longitudinal axis, and said set screw engaging said collar to limit rotation of said locator means about said longitudinal axis.

8. The modular fixturing apparatus component in claim 1, wherein said means for limiting rotation further comprises a collar, said collar adapted to limit rotation of said locator means about said longitudinal axis but permit said locator means to move linearly along said longitudinal axis, and said set screw engaging said collar to limit rotation of said locator means about said longitudinal axis.

9. The modular fixturing apparatus component in claim 1, wherein said locator means includes at least one tapered surface for locating the opening.

10. The modular fixturing apparatus component in claim 9, wherein said tapered surface comprises a conical surface.

11. The modular fixturing apparatus component in claim 10, wherein said conical surface comprises a frusto-conical surface.

12. A modular fixturing apparatus component comprising:
a body having a longitudinal axis;
locator means supported in said body for linear movement along said longitudinal axis and rotational movement about said axis, said locator means for locating a center of an opening in an article; and
means for limiting rotation of said locator means.

13. The modular fixturing apparatus component in claim 12, wherein said means for limiting rotation comprises a collar, said collar positioned in said body and adapted to limit rotation of said locator means about said longitudinal axis, said collar permitting said locator means to move linearly along said longitudinal axis, and said means for limiting rotation of said locator means further comprising means for limiting rotation of said collar in said body.

14. The modular fixturing apparatus component in claim 12, wherein said body comprises a cylindrical body.

15. The modular fixturing apparatus component in claim 12, wherein said locator means includes at least one tapered surface for locating the opening.

16. The modular fixturing apparatus component in claim 15, wherein said tapered surface comprises a conical surface.

17. The modular fixturing apparatus component in claim 16, wherein said conical surface comprises a frusto-conical surface.

18. The modular fixturing apparatus component in claim 12, wherein said body includes a groove, said groove for receiving a clamp for securing said component to a base plate.

19. A modular fixturing apparatus component comprises:
a body having a longitudinal axis;
a support surface provided at said body, said support surface providing support for the article along said longitudinal axis, wherein said support surface is adjustable along said longitudinal axis; and
a bushing, said bushing mounted to said body and providing said support surface, wherein said bushing includes a threaded portion, said threaded portion mounting said bushing to said body and providing adjustment to said support surface along said longitudinal axis.

20. The modular fixturing apparatus component according to claim 19, further comprising a threaded annular member, said threaded annular member mounted on said threaded portion of said bushing and locking said bushing in a fixed position along said longitudinal axis when said threaded annular member is tightened against said body.

21. The modular fixturing apparatus component according to claim 20, further comprising a pin, said bushing including a central opening, said pin supported in said body for movement along said longitudinal axis and being extendable through said opening of said bushing to provide a locating function for said modular fixturing apparatus.

22. The modular fixturing apparatus component according to claim 21, wherein said body includes means for limiting rotation of said pin about said longitudinal axis.

* * * * *

UNITED STATES PATENT AND TRADEMARK OFFICE
CERTIFICATE OF CORRECTION

| | | |
|---|---|---|
| PATENT NO. | : 7,036,810 B2 | Page 1 of 1 |
| APPLICATION NO. | : 10/355709 | |
| DATED | : May 2, 2006 | |
| INVENTOR(S) | : H. James Vander Wal, III | |

It is certified that error appears in the above-identified patent and that said Letters Patent is hereby corrected as shown below:

Column 5:
Line 8, "arc" should be --are--.

Column 9:
Line 9, Claim 6, "comprises a cylindrical body." should be --includes an annular groove, said annular groove for receiving a clamp for securing said component to a base plate.--.

Column 10:
Line 2, Claim 14, "12" should be --13--.
Line 16, Claim 19, "comprises" should be --comprising--.
Line 43, Insert Missing Claim --23. The modular apparatus component in claim 13, wherein said means for limiting rotation of said collar comprises at least one screw, said screw extending through said body to fix said collar about said longitudinal axis to thereby limit rotation of said locator means.--.

Signed and Sealed this

Twenty-seventh Day of May, 2008

JON W. DUDAS
*Director of the United States Patent and Trademark Office*